United States Patent
Hoffman, Jr. et al.

(10) Patent No.: US 12,318,748 B2
(45) Date of Patent: Jun. 3, 2025

(54) MICROCAPSULES FOR USE WITH POLYURETHANE AND EPOXY ADHESIVES

(71) Applicant: The Johns Hopkins University, Baltimore, MD (US)

(72) Inventors: Christopher M. Hoffman, Jr., Odenton, MD (US); Brian M. Koronkiewicz, Pasadena, MD (US); Reid E. Messersmith, Severna Park, MD (US); Mairead E. Bartlett, Takoma Park, MD (US)

(73) Assignee: The Johns Hopkins University, Baltimore, MD (US)

( * ) Notice: Subject to any disclaimer, the term of this patent is extended or adjusted under 35 U.S.C. 154(b) by 206 days.

(21) Appl. No.: 17/954,744

(22) Filed: Sep. 28, 2022

(65) Prior Publication Data

US 2023/0097635 A1   Mar. 30, 2023

Related U.S. Application Data (60) Provisional application No. 63/249,720, filed on Sep. 29, 2021.

(51) Int. Cl.
| | |
|---|---|
| *B01J 13/16* | (2006.01) |
| *B32B 15/04* | (2006.01) |
| *B32B 15/18* | (2006.01) |
| *B32B 37/12* | (2006.01) |
| *C09J 5/00* | (2006.01) |
| *C09J 175/04* | (2006.01) |

(52) U.S. Cl.
CPC ............. *B01J 13/16* (2013.01); *B32B 15/043* (2013.01); *B32B 15/18* (2013.01); *B32B 37/1284* (2013.01); *C09J 5/00* (2013.01); *C09J 175/04* (2013.01); *B32B 2255/06* (2013.01); *B32B 2255/26* (2013.01); *B32B 2305/54* (2013.01); *B32B 2311/30* (2013.01); *C09J 2475/00* (2013.01)

(58) Field of Classification Search
None
See application file for complete search history.

(56) References Cited

U.S. PATENT DOCUMENTS

| | | | |
|---|---|---|---|
| 11,203,694 B2 | 12/2021 | Hoffman, Jr. et al. | |
| 2015/0231589 A1* | 8/2015 | Arumugam | B01J 13/16 524/445 |

FOREIGN PATENT DOCUMENTS

WO   2012/166884 A2   12/2012

OTHER PUBLICATIONS

Reid E. Messersmith et al., "Rapid Underwater Adhesive Utilizing Crosslinker and Amine Catalyst-Filled Microcapsules," CS Appl. Polym. Mater. 3, 2, Jan. 5, 2021, pp. 996-1002.

* cited by examiner

*Primary Examiner* — Jeffrey D Washville
(74) *Attorney, Agent, or Firm* — Noah J. Hayward (57) ABSTRACT

A microcapsule for use with an underwater adhesive includes a shell including nanoclay platelets and a polyurea product of an interfacial polymerization of a polyamine and an aromatic polyisocyanate. The microcapsule further includes a core composition encapsulated by the shell. The core composition includes a base catalyst for formation of a polyurethane, a polyol, and a hydrophilic solvent.

12 Claims, 4 Drawing Sheets

MICROCAPSULES FOR USE WITH POLYURETHANE AND EPOXY ADHESIVES

CROSS REFERENCE TO RELATED APPLICATIONS

This application claims priority to and the benefit of prior-filed, U.S. Provisional Application No. 63/249,720 filed Sep. 29, 2021, the entire disclosure of which is incorporated herein by reference.

BACKGROUND

Microcapsules for use with polyurethane and epoxy adhesives are described, as well as compositions for the manufacture of the microcapsules, methods for the manufacture of the microcapsules, adhesive formulations including the microcapsules, and methods of using the adhesives.

Polyurethane and epoxy adhesives have a wide range of applications, including automotive, construction, maritime and biomedical uses, among others. Such adhesives are generally provided as two-part formulations to prevent early cure. Cure is initiated by combining the two parts. The cure rate of polyurethane and epoxy adhesives can limit their adoption for time-sensitive applications. The reaction rate can be dramatically increased in the presence of a tertiary amine catalyst, but increased reaction rate results in less time to mix the two parts to obtain good dispersion of the components, and apply the adhesive. Both good dispersion and physical separation can be achieved by microencapsulation of the catalyst in one of the components of the adhesive. After mixing the microcapsules can be ruptured by applying pressure, thereby releasing the catalyst and initiating fast cure.

Suitable microcapsules for use with such delayed release, or pressure-sensitive adhesives are particularly difficult to formulate because they must satisfy a variety of criteria. For example, the microcapsules desirably minimize leakage of internal components, withstand the physical forces associated with mixing, and release components under the appropriate stimuli, in particular pressure. Preferably, the microcapsules are in a form that is readily handled, and shelf-stable.

There remains a continuing need in the art for microcapsules for use with polyurethane and epoxy adhesives and methods for their manufacture, where the microcapsules a good combination of low permeability, mechanical strength, easy handling, and stability.

BRIEF SUMMARY

Provided is a microcapsule for use, for example, with a polyurethane or epoxy adhesive, where the microcapsule includes a shell including nanoclay platelets and a polyurea product of an interfacial polymerization of a polyamine and an aromatic polyisocyanate, and a core composition encapsulated by the shell. The core composition includes a base catalyst for formation of a polyurethane, a polyol, and a hydrophilic solvent.

A method of making the microcapsule, or a plurality thereof, includes forming a biphasic polymerizable mixture including an aqueous solvent, an organic solvent immiscible with the aqueous solvent, the nanoclay platelets, the polyamine, the aromatic polyisocyanate, the base catalyst for formation of a polyurethane, and the polyol. The method further includes providing multiple interfaces between the aqueous phase and the organic phase in the biphasic polymerizable mixture, and polymerizing the polyamine and the aromatic polyisocyanate at the multiple interfaces to provide the plurality of the microcapsules.

Also provided is a composition for the manufacture of the microcapsule, the composition including a biphasic polymerizable mixture including an aqueous solvent, an organic solvent immiscible with the aqueous solvent, the nanoclay platelets, the polyamine, the aromatic polyisocyanate, the base catalyst for formation of a polyurethane, and the polyol.

A pressure-sensitive adhesive formulation is also provided, including a curable polyurethane adhesive formulation or an epoxy adhesive formulation and a plurality of the microcapsules disposed in a part of the curable polyurethane adhesive formulation or an epoxy adhesive formulation.

A pressure-sensitive adhesive formed from the pressure-sensitive adhesive formulation is also described.

A method for the adhesion of a first substrate and a second substrate includes disposing the pressure-sensitive adhesive formulation between the first substrate and the second substrate, and applying pressure to the adhesive formulation in an amount effective to rupture the plurality of microcapsules and form an adhesive layer between the first substrate and the second substrate.

The above described and other features are exemplified by the following figures, detailed description, examples, and claims.

BRIEF DESCRIPTION OF THE DRAWINGS

The following figures illustrate non-limiting, example embodiments, in which.

DETAILED DESCRIPTION

Example embodiments include compositions for the manufacture of polyurea microcapsules for use in pressure-sensitive polyurethane and epoxy adhesive formulations, where the microcapsules can have an excellent combination of properties, in particular low permeability. The microcapsules can further have mechanical strength that allows both mixing and rupture under an applied pressure. In a particular advantage, the microcapsules can be obtained in powder form, which provides easy handling. In a still further advantage, the microcapsules are stable at room temperature, and thus can be stored for packaging, shipping, and before use. Without being bound by theory, it is believed that the polyurea microcapsules have these advantageous properties by use of an aromatic crosslinker in the manufacture of the microcapsules.

In particular, the microcapsules include a shell including a polyurea and nanoclay platelets. The polyurea is the product of a selective interfacial polymerization of a polyamine and an aromatic polyisocyanate in the presence of a polyol and a tertiary amine. The shell encapsulates a core composition that includes a base catalyst for formation of a polyurethane, the polyol, and a hydrophilic solvent. Upon rupture of the shell, the polyol can act as a crosslinker for polyurethane-based adhesives. Tertiary amines are effective catalysts both for both the formation of the polyurea and the crosslinking of the polyurethane, and thus can serve a dual role to expedite shell formation, and later accelerate adhesive polymerization. The microcapsule shells need to balance stability and fragility, so they are able to withstand processing but remain sensitive to mechanical stimuli for deployment. Optimized processing of these polyol crosslinker and catalyst-filled, polyurea microcapsules produces a dry powder that, when mixed with an isocyanate resin, can cure rapidly when shear forces are applied under dry, wet, or underwater conditions.

The polyurea of the shell is made by interfacial polymerization of a polyamine and an aromatic polyisocyanate. The polyamine contains at least two, and preferably more than two primary amino groups, and can be linear or branched, saturated, unsaturated, or aromatic. Branched, aliphatic polyamines are preferred. Exemplary polyamines include aliphatic amines, such as ethylenediamine, diethylenetriamine, triethylenetetramine, tetraethylenepentamine, 1,3-propylenediamine, or hexamethylenediamine; epoxy compound addition products from aliphatic polyamines, such as poly(1 to 5)alkylene($C_{2-6}$)polyamine-alkylene($C_{2-18}$) oxide addition products; aromatic polyamines, such as phenylenediamine, diaminonaphthalene, or xylylenediamine; alicyclic polyamines such as piperazine; heterocyclic diamines such as 3,9-bis-aminopropyl-2,4,8,10-tetraoxaspiro-[5.5]undecane. A combination of polyamines can be used.

In an aspect, poly amine is a polyethyleneimine (PEI), tetraethylenepentamine, diethylenetriamine, 2-aminoethylethanolamine, ethylene diamine, triethylene tetramine, or a combination thereof. Preferably the polyamine is a branched PEI. The polyamines can have a weight average molecular weight (Mw) of 250 to 1,0000 kilodalton (KDa), or a number average molecular weight (Mn) of 20 to 120 KDa as determined, for example, by light scattering (LS).

The aromatic polyisocyanate includes more than one isocyanate group and at least one aromatic group. The amount of polyisocyanate used to prepare the prepolymer is that amount that gives the desired properties such as shell thickness, morphology, and shelf-life. In an aspect the aromatic polyisocyanate is of Formula I:

wherein in formula I, each R is independently hydrogen, halide, nitro, cyano, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, $C_{7-13}$ alkylaryloxy, —C(O)$R^4$, —OC(O)$R^5$, —C(O)O$R^6$, —C(O)N($R^7$)($R^8$), or —N($R^9$)$_3$, wherein $R^4$ to $R^9$ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{1-12}$ arylalkyl, $C_{7-13}$ arylalkoxy, $C_{7-13}$ alkylaryl, or $C_{7-13}$ alkylaryloxy;

A is a $C_{6-36}$ aryl or $C_{2-17}$ heteroaryl group having at least one aromatic ring and a valence z;

each L is independently a single bond, $C_{1-12}$ alkylene, $C_{2-12}$ alkenylene, $C_{6-12}$ arylene, —C(O)—, —O—, —N($R^{11}$)—, —S—, —S(O)—, —S(O$_2$—, or —Si(O)($R^{12}$)($R^{13}$)—, wherein $R^{11}$ to $R^{13}$ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ alkoxyaryl, or $C_{7-13}$ alkylaryl; and x is 1-z and y is 1-6, provided that x or y is at least 2.

In an aspect in Formula I, each R is independently hydrogen, nitro, cyano, $C_{1-12}$ alkyl, $C_{1-12}$ alkoxy, $C_{2-12}$ alkoxyalkyl, $C_{2-12}$ alkenyl, $C_{3-8}$ cycloalkyl, $C_{6-14}$ aryl, $C_{6-10}$ aryloxy, $C_{7-12}$ aryloxyalkyl, $C_{7-13}$ arylalkyl, $C_{7-13}$ arylalkoxy, $C_{7-13}$ alkylaryl, or CC$_{7-13}$ alkylaryloxy; A is a $C_{6-36}$ aryl; each L is independently a single bond, $C_{1-12}$ alkylene, $C_{2-12}$ alkenylene, $C_{6-12}$ arylene, —C(O)—, —O—, —N($R^{11}$)—, —S—, —S(O)—, —S(O)$_2$—, or —Si(O)($R^{12}$)($R^{13}$)—, wherein $R^{11}$ to $R^{13}$ are each independently $C_{1-12}$ alkyl, $C_{1-12}$ alkoxy, $C_{2-12}$ alkoxyalkyl, $C_{6-14}$ aryl, $C_{6-10}$ aryloxy, $C_{7-13}$ aryloxyalkyl, $C_{7-13}$ arylalkyl, $C_{7-13}$ alkoxyaryl, or $C_{7-13}$ alkylaryl; and x is 2-4, more preferably 2-3; and y is 1-3, more preferably 1-2, provided that x+y is 2 or 3.

In another aspect in Formula I, each R is independently hydrogen, nitro, cyano, $C_{1-6}$ alkyl, $C_{1-6}$ alkoxy, $C_{2-8}$ alkoxyalkyl, $C_{2-6}$ alkenyl, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy; A is a $C_{6-24}$ aryl; each L is independently a single bond, $C_{1-6}$ alkylene, $C_{2-6}$ alkenylene, $C_{6-12}$ arylene, —O—, —N($R^{11}$)—, —S—, —S(O)—, —S(O)—, or —Si(O)($R^{12}$)($R^{13}$)— wherein $R^{11}$ to $R^{13}$ are each independently $C_{1-6}$ alkyl, $C_{1-6}$ alkoxy, $C_{2-6}$ alkoxyalkyl, $C_{6-14}$ aryl, $C_{6-10}$ aryloxy, $C_{7-13}$ aryloxyalkyl, $C_{7-13}$ arylalkyl, $C_{7-13}$ alkoxyaryl, or $C_{7-13}$ alkylaryl; and x is 2-4, more preferably 2-3; and y is 1-3, more preferably 1-2, provided that x+y is 2 or 3.

In another aspect, the aromatic polyisocyanate is of Formula Ia:

wherein in formula Ia, each R is independently hydrogen, halide, nitro, cyano, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{1-13}$ alkylaryl, $C_{7-13}$ alkylaryloxy, —C(O)$R^4$, —OC(O)$R^5$, —C(O)O$R^6$, —C(O)N($R^7$)($R^8$), or —N($R^9$)$_3$, wherein $R^4$ to $R^9$ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy;

A is an aryl or heteroaryl group having a valence z;

each $R^1$ is independently hydrogen, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{6-8}$ cycloalkoxy, $C_{6-14}$ aryl, $C_{6-10}$ aryloxy, $C_{1-13}$ aryloxyalkyl, $C_{7-13}$ arylalkyl, $C_{7-13}$ arylalkoxy, $C_{7-13}$ alkylaryl, or $C_{7-13}$ alkylaryloxy; and x is 1-z and y is 1, provided that x is at least 2.

In an aspect in formula Ia, each R is independently hydrogen, nitro, cyano, $C_{1-6}$ alkyl, $C_{1-6}$ alkoxy, $C_{2-8}$ alkoxyalkyl, $C_{2-6}$ alkenyl, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy; A is a A is a $C_{6-24}$ aryl; x is 2-4, more preferably 2-3; and y is 1, more preferably x is 2-3 and y is 1.

Preferably the aromatic polyisocyanate is a compound. In still another aspect, the aromatic polyisocyanate is of Formula Ib:

(Ib)

wherein in formula Ib, each R is independently hydrogen, halide, nitro, cyano, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{1-8}$ cycloalkoxy, $C_{6-14}$ aryl, $C_{1-10}$ aryloxy, $C_{7-13}$ aryloxyalkyl, $C_{7-13}$ arylalkyl, $C_{7-13}$ arylalkoxy, $C_{7-13}$ alkylaryl, $C_{7-13}$ alkylaryloxy, —C(O)R$^4$, —OC(O)R$^5$, —C(O) OR$^6$, —C(O)N(R$^7$)(R$^8$), or —N(R$^9$)$_3$, wherein R$^4$ to R$^9$ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{2-13}$ aryloxyalkyl, $C_{7-13}$ arylalkyl, $C_{7-13}$ arylalkoxy, $C_{7-13}$ alkylaryl, or $C_{7-13}$ alkylaryloxy;

each L is independently a single bond, $C_{1-12}$ alkylene, $C_{2-12}$ alkenylene, $C_{6-12}$ arylene, —C(O)—, —O—, —N(R$^{11}$)—, —S—, —S(O)—, —S(O)$_2$—, or —Si(O)(R$^{12}$) (R$^{13}$)—, wherein R$^{11}$ to R$^{13}$ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ alkoxyaryl, or $C_{7-13}$ alkylaryl; and In an aspect in Formula Ib, each R is independently hydrogen, nitro, cyano, $C_{1-6}$ alkyl, $C_{1-6}$ alkoxy, $C_{2-8}$ alkoxyalkyl, $C_{2-6}$ alkenyl, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy; A is a $C_{6-24}$ aryl; each L is independently a single bond, $C_{1-6}$ alkylene, $C_{2-6}$ alkenylene, $C_{6-12}$ arylene, —O—, —N(R$^{11}$)—, —S—, —S(O)—S(O)$_2$—, or —Si (O)(R$^{12}$)(R$^{13}$)— wherein R$^{11}$ to R$^{13}$ are each independently $C_{1-6}$ alkyl, $C_{1-6}$ alkoxy, $C_{2-6}$ alkoxyalkyl, $C_{6-14}$ aryl, $C_{6-10}$ aryloxy, $C_{7-13}$ aryloxyalkyl, $C_{7-13}$ arylalkyl, $C_{7-13}$ alkoxyaryl, or $C_{7-13}$ alkylaryl; x is 2-4, more preferably 2-3; and y is 1-3, more preferably 1-2, provided that x+y is 2 or 3.

In yet another aspect, the aromatic polyisocyanate is of Formula Ic:

(Ic)

wherein in Formula Ic, each R is independently hydrogen, halide, nitro, cyano, $C_{1-12}$ alkyl, $C_{2-12}$ alkoxy, $C_{1-12}$ alkoxyalkyl, $C_{2-12}$ alkenyl, $C_{2-12}$ alkenyloxy, $C_{3-8}$ cycloalkyl, $C_{6-14}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, $C_{7-13}$ alkylaryloxy, —C(O)R$^4$, —OC(O)R$^5$, —C(O)OR$^6$, —C(O)N(R$^7$)(R$^8$), or —N(R$^9$)$_3$, wherein R$^4$ to R$^9$ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-12}$ aryloxyalkyl, $C_{7-13}$ arylalkyl, $C_{7-13}$ arylalkoxy, $C_{7-13}$ alkylaryl, or $C_{7-13}$ alkylaryloxy;

each R$^1$ is independently hydrogen, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy;

x is 2-6 and y is 1.

In another aspect in Formula Id, each R is independently hydrogen, nitro, cyano, $C_{1-6}$ alkyl, $C_{1-6}$ alkoxy, $C_{2-8}$ alkoxyalkyl, $C_{2-6}$ alkenyl, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy; A is a $C_{6-24}$ aryl; x is 2-4, more preferably 2-3; and y is 1, and more preferably x is 2-3 and y is 1.

In another aspect in Formula Id, each R is H, each R$^1$ is independently a $C_{1-14}$ alkyl, y is 1, and x is 2.

Exemplary aromatic polyisocyanates include p-phenylene diisocyanate, m-phenylene diisocyanate, o-phenylene diisocyanate, 1,2,3-phenylene triisocyanate, 1,2,4-phenylene triisocyanate, 1,3,4-phenylene diisocyanate, 2,3-toluene diisocyanate, 2,4-toluene diisocyanate, 2,5-toluene diisocyanate, 3,4-toluene diisocyanate, 3,5-toluene diisocyanate, 1,4-bis (isocyanatomethyl)benzene, 1,3-bis(isocyanatomethyl)benzene, 1,3-is(isocyanatomethyl)benzene 1,3-bis(2-isocyanatopropan-2-yl)benzene, 2,2-bis(4-isocyanatophenyl) propane, triphenylmethane 4,4',4"-triisocyanate, meta-xylene diisocyanate, or a combination thereof.

A preferred aromatic polyisocyanate is of Formula Id wherein each R is H, each R$^1$ is methyl, x is 2, and y is 1, and x is 2. This compound is known as 1,3-bis(2-isocyanatopropan-2-yl)benzene, or tetramethylxylylene diisocyanate (TMXDI).

The polyurea shell further includes a nanoclay, preferably a nanoclay that is modified with an organic compound to provide platelets. Such modified nanoclays can include nanoclays such as montmorillonite (MMT), laponite, bentonite, hectorite, saponite, halloysite (kaolin), or cloisite Na$^+$. Preferred nanoclays are the layered mineral silicates such as MMT, bentonite, or halloysite modified on their surfaces with an onium compound having at least one ligand with a hydrophobic group. Onium compounds are positively charged salts of nitrogen, phosphorous, sulfur and the like, and the hydrophobic groups can have, for example, 1 to 36 carbon atoms. Exemplary onium compounds are tetra($C_{6-18}$ alkyl) ammonium or phosphonium halides. Such nanoclays are commercially available, for example from Southern Clay products under the trade names and designations of CLOISITE® 20A, CLOISITE® 30B, CLOISITE® 10A and CLOISITE® 93 A nanoclays, and any of the modified particles described in International Patent Publication No. WO 2012/166884 A2.

The properties of the polyurea shell can be adjusted by adjusting the viscosity of the solvents, the reactivity rates of the polyamine and the polyisocyanate at given temperature, and the solubility of the polyurea at different molecular weights.

The polyurea shell encompasses, i.e., surrounds and contains, a core that includes a base catalyst for formation of a polyurethane or epoxy adhesive, a polyol for the formation of a polyurethane or epoxy adhesive, and a hydrophilic solvent.

The base catalyst is advantageously selected to catalyze both the polyurea crosslinking with the aromatic polyisocyanate as well as curing of a polyurethane or epoxy adhesive formulation to provide an adhesive. Preferably the base catalyst is a tertiary amine, for example 1,4-diazabicyclo[2.2.2]octane, 7-methyl-1,5,7-triazabicyclo(4.4.0)dec-5-ene, 1,8-diazabicyclo[5.4.0]undec-7-ene, 1,5-diazabicyclo [4.3.0]non-5-ene, quinuclidine, pempidine, tributlyamine, triethylamine, 1,4-diazabicycl2[2.2.2]octan, collidine, 2,6-lutidine, N-methyl morpholine, hexamethylenetetramine, or a combination thereof. For example, the base catalyst can be 1,4-diazabicyclo[2.2.2]octane.

Suitable polyols for use in polyurethane or epoxy adhesive are known in the art. The polyol is selected to be soluble in water. When combined with the polyurethane or epoxy adhesive formulation and subsequently released from the polyurea shell under pressure, the polyol crosslinks or otherwise reacts with the components of the polyurethane or epoxy adhesive formulation to form the adhesive.

Exemplary polyols that can be used have at least two hydroxy groups, for example 2 to 6 hydroxyl groups. Preferably the polyol has 2-3 hydroxy groups. Polyols that can be used include, for example, aliphatic $C_{1-30}$ polyols, or $C_{3-20}$ polyols, or $C_{3-10}$ polyols such as ethylene glycol, diethylene glycol, propylene glycol, dipropylene glycol, butanediol, glycerol, trimethylolpropane, triethanolamine, pentaerythritol, sorbitol, and combinations thereof. Preferably glycerol is used.

As stated above, the microcapsules are manufactured by interfacial polymerization of a composition including a hydrophilic solvent and a hydrophobic solvent, as well as the polyurea, the nanoclay, the polyisocyanate, the amine base, and the polyol. In the polymerization, at least one reactant is soluble in each phase so that the polymerization reaction occurs primarily or solely at the interface. The hydrophobic solvent is aqueous, including water. In an aspect, the hydrophobic solvent is water. The hydrophilic solvent preferably has no, or very low water solubility, in order to form two phases. Examples of hydrophobic solvents include mineral oil, alkanes (hexane, pentane, heptane, octane, and the like), esters (ethyl acetate, butyl acetate), ketones (methyl ethyl ketone (MEK), methyl isobutyl ketone (MIBK)), aromatics (toluene, benzene, xylene, or the like), cycloalkanes (cyclohexane, for example), haloalkanes (chloroform, trichloroethylene, carbon tetrachloride or the like), ethers (diethyl ether), or combinations thereof. Preferred hydrophobic solvents include, for example, mineral oil, toluene, xylene, chlorobenzene, dichlorobenzene, trichlorobenzene, cyclohexane, chloroform, or a combination thereof.

A variety of interfacial procedures for the formation of microcapsules have been described and can be used. A technique known as Pickering emulsion stabilization in particular can be used to stabilize the discontinuous phases in an emulsions or suspension, using small solid particles to reduce the interfacial tension at the oil/water interface, for example clay nanoparticles. Accordingly, a method of preparing a plurality of the microcapsules includes forming a biphasic polymerizable mixture including an aqueous solvent, an organic solvent immiscible with the aqueous solvent, the nanoclay, the polyamine, the aromatic polyisocyanate, the base catalyst for formation of a polyurethane, and the polyol; providing multiple interfaces between the aqueous phase and the organic phase in the biphasic polymerizable mixture; and polymerizing the polyamine and the aromatic polyisocyanate at the multiple interfaces to provide the plurality of the microcapsules.

The relative amount of each component in the biphasic mixture can vary widely, and each is adjusted to provide the desired microcapsule properties. For example, the nanoclay can be dispersed in an amount of 0.1% to 10% by weight, based on the total weight of the dispersion medium (the total weight of hydrophilic and hydrophobic solvent). The polyamine can be dispersed in an amount of 0.5% to 10% by weight, based on the total weight of the dispersion medium. The aromatic polyisocyanate, the base catalyst, and the polyol can each be dispersed in an amount of 1% to 20% by weight, each based on the total weight of the dispersion medium.

The biphasic mixture can be formed by preparing a first solution that includes the aqueous solvent, the polyamine, the base catalyst, and the polyol. In an aspect, the aqueous solvent (water), and the base catalyst are first combined, then the polyamine, for example an aqueous solution of the polyamine, is added to form the first solution. The first solution can be heated and stirred until homogenous, for example at a temperature of 30° C. to 90° C., or 40° C. to 80° C. A second solution including the nanoclay in the hydrophobic solvent (e.g., heavy mineral oil) is prepared, and preferably homogenized to obtain a low viscosity, semitransparent, and completely mixed solution The second solution is added to the homogenous first solution, and mixed until a stable suspension is achieved. A third solution including the polyisocyanate in heavy mineral oil is added to the suspension, mixed, and polymerization (crosslinking) is allowed to proceed at the multiple interfaces of the suspension. Conditions can include heat and stirring, for example at of 30° C. to 90° C., or 40° C. to 80° C., for 12 to 24 hours. The formed microcapsules can be isolated by addition of a low boiling point hydrophobic solvent such as diethyl ether, and decanting the supernatant. The addition/decanting can be repeated to wash the microcapsules, which can be subsequently allowed to dry. The microcapsules can have an average diameter of 1 to 2,000 micrometers, or 5 to 1,000 micrometers, or 10 to 500 micrometers, for example. Average diameter can be determined by methods known in the art, for example light scattering.

The microcapsules can be used to initiate or increase reaction rate (or both) in a polyurethane or epoxy adhesive formulation by the application of pressure sufficient to rupture some, most, or all of the plurality of microcapsules. The polyurethane or epoxy adhesive formulation can be provided as a one- or two-part formulation. If two-part, a plurality of the microcapsules can be present in either or both part. In an aspect, the microcapsule can provide a two-step cure. For example, cure can be initiated by exposing the adhesive formulation to air, for example, or by mixing the two parts, followed by the application of pressure.

Polyurethane adhesives are known in the art, and are those adhesives in which the molecular backbone of the polymer contains multiple urethane groups. Typical urethane adhesives may contain aliphatic and aromatic hydrocarbon, ester, ether, amide, urea, and allophanate (allophonate) groups in addition to urethane linkages. To form the adhesive, isocyanate groups of an isocyanate-containing compound react with the hydroxyl groups of a polyol to form repeating urethane linkages. Linear polyurethane adhesives can be obtained by using compounds having two reactive groups, such as diisocyanates and diols. When a polyol having three or more hydroxyl groups (i.e., a functionality of 3 or greater) is reacted with a polyisocyanate, or when an isocyanate having three or more isocyanate groups is reacted with a polyol, the resulting polymer is crosslinked. In reaction systems with excess isocyanate, crosslinking reactions may occur.

Polyurethane adhesive formulations accordingly include at least one isocyanate-containing ompound, which as used herein includes compounds, oligomers, polymers, and the like. Suitable isocyanate-containing compounds for the adhesives are aromatic isocyanates, alicyclic isocyanates and derivatives thereof. The isocyanate-containing compounds can be in the form of monomers or oligomers or prepolymers prepared from such monomers. The isocyanate-containing compounds can have an average isocyanate functionality of at least about 2.0 and an equivalent weight of at least about 80. Representative isocyanate-containing compounds include toluene diisocyanate, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, the biuret of 1,6-hexamethylene diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, polyisocyanates, 1,4-butylene diisocyanate, and methylene bis(4-cyclohexyl isocyanate), isophorone diisocyanate. For example, the isocyanate-containing compounds can include diphenylmethane diisocyanate and oligomeric or polymeric derivatives thereof, isophorone diisocyanate, 1,6-hexamethylene diisocyanate and polymeric derivatives thereof, bis(4-isocyanatocylohexyl)methane, and trimethyl hexamethylene diisocyanate. In an aspect the isocyanate is diphenylmethane diisocyanate and oligomeric or polymeric derivatives thereof. The adhesive compositions can include prepolymers as is known in the art, such as isocyanate-containing polyether polyols, polyester polyols, polybutadiene polyols, polyisoprene polyols, and the like.

Epoxy adhesive formulations are also known in the art, and are those adhesives in which the molecular backbone of the polymer contains multiple ether groups. Epoxy resins may be reacted (cross-linked) either with themselves through catalytic homopolymerisation, or with a wide range of co-reactants including polyfunctional amines, acids, acid anhydrides, phenols, alcohols and thiols. These co-reactants are often referred to as hardeners or curatives.

Epoxy adhesive formulations accordingly include at least one epoxy-containing compound, which as used herein includes compounds, oligomers, polymers, and the like. Suitable epoxy-containing compounds include polyepoxides, for example glycidyl ethers such as aliphatic di-, tri-, or higher glycidyl ethers (e.g., epoxidized vegetable oils), cycloaliphatic di-, tri-, or higher glycidyl ethers, or aromatic di-, tri-, or higher glycidyl ethers (e.g., diglycidyl ethers of bisphenol A, bisphenol F, bisphenol S, or halogenated derivatives thereof), epoxyphenol novolak (EPN), epoxycresol novolak (ECN), silicone-modified epoxies, and the like. Specific examples include glycidyl esters of aromatic carboxylic acids (e.g., diglycidyl phthalate, diglycidyl isophthalate, triglycidyl trimellitate, and tetraglycidyl pyromellitate), and N, N'-tetraglycidyl-4,4'-methylenedianiline, ethylene glycol diglycidyl ether, propylene glycol diglycidyl ether, tetramethylene glycol diglycidyl ether, 1,6-hexanediol diglycidyl ether, polyethylene glycol diglycidyl ether, polypropylene glycol diglycidyl ether, polytetramethylene glycol diglycidyl ether, neopentyl glycol diglycidyl ether, trimethylolpropane triglycidyl ether, glycerol triglycidyl ether, pentaerythritol polyglycidyl ether, sorbitol polyglycidyl ether, polyglycerol polyglycidyl ether, polyglycidyl esters of polyvalent fatty acids, including oxalic acid diglycidyl ester, maleic acid diglycidyl ester, succinic acid diglycidyl ester, glutaric acid diglycidyl ester, adipic acid diglycidyl ester, pimelic acid diglycidyl ester epoxy cresol-novolac resins, epoxy phenol-novolac resins, or the like.

Other components of the polyurethane or epoxy adhesive formulation can include polyols, an additive, such as an adhesion promoter, a diluent or carrier, a cross-linker, a polymerization initiator, a surfactant, a thickener or anti-settling agent, an antioxidant, a colorant (such as pigments or dyes), an ultraviolet (UV) light stabilizer, a UV absorbing additive, a filler, a plasticizer, a reinforcing agent, or a combination thereof, with the proviso that the additives do not adversely affect the desired adhesive properties. When present, the additives can be included in any effective amount, for example in an amount of 0.001 to 50 wt %, preferably 0.001 to 30 wt %, more preferably 0.005 to 20 wt %, even more preferably 0.01 to 10 wt % or 0.01 to 5 wt % based on the total weight of the precursor composition.

Many different polyurethane and epoxy adhesive formulations are commercially available and can be used. A pressure-sensitive polyurethane or epoxy adhesive formulation accordingly includes a plurality of the microcapsules; and the polyurethane or epoxy adhesive formulation. As stated above, if a two-part formulation is used the plurality of the microcapsules can be present in either or both parts. For example, a pressure-sensitive polyurethane adhesive formulation can include a part including the isocyanate-containing compound reactive with the polyol in the presence of the base and the microcapsules. A pressure-sensitive epoxy adhesive formulation can include a part including a hardener and the plurality of microcapsules.

A method of adhering a first and a second substrate includes disposing the pressure-sensitive polyurethane or epoxy adhesive formulation between the first substrate and the second substrate; and applying pressure to the adhesive formulation effective to rupture the plurality of microcapsules and form an adhesive layer between the first substrate and the second substrate. The pressure-sensitive polyurethane or epoxy adhesive formulation, if two-part, can first be combined, and then can be disposed on, i.e., applied to the first substrate, the second substrate, or both by spray coating, dip coating, brushing, roller coating, curtain coating, spin coating, flow coating, soaking, or a combination thereof. Preferably, the adhesive formulation is applied by brushing, roller coating, dipping, or spraying. Any solvent or diluent carrier, if any, can be removed by evaporation after the pressure-sensitive polyurethane or epoxy adhesive formulation has been applied to the substrate(s).

In an aspect, the adhering is underwater. The underwater pressure-sensitive polyurethane or epoxy adhesives described herein have one or more, preferably all, of high bond strength, low (fast) cure times, and can provide adhesion on untreated surfaces. The polyurethanes contain both hydrogen bond acceptors and donors (N—H and C=O, respectively), and thus allow intermolecular interactions with numerous types of substrates.

The pressure-sensitive polyurethane or epoxy adhesive formulations can be used as part of a system that includes a surface primer in addition to the pressure-sensitive adhesive formulation. A series of primers and a filler can be used depending on the condition of the substrate (e.g., a marine structure) to be coated. For example, a rough or dented surface can be prepared using a primer followed by a filler and sanding before applying another compatible primer, and then followed by a top coat of the curable composition. The sequence of application steps and selection of appropriate coating layers can be determined based on the substrate and its condition. A primer or adhesion-promoting coating (i.e., a tie coat or undercoat) can be applied to the substrate before applying the pressure-sensitive adhesive precursor composition. The adhesive or tie layer can include a polymeric adhesive, such as a thermoplastic adhesive, a thermoset adhesive, an elastomeric adhesive, an alloy adhesive, a non-polymeric adhesive, or a combination thereof as is known in the art. Exemplary adhesives include a polyurethane, an epoxy resin, an epoxy polysiloxane, a natural or synthetic rubber that is optionally chlorinated such as chloroprene and neoprene, or a silicone elastomer such as butyral-silicone rubber.

The pressure-sensitive polyurethane or epoxy adhesive formulations can be applied to a substrate to which surface treatments or other coating layers have been previously applied. Examples of such surface treatments and other coating layers include anticorrosion coatings, bactericidal anti-fouling coatings, sealer coats, tie-coats, adhesion promoting coatings, or the like, or a combination thereof. For example, an anti-corrosion coating, a sealer coating, a primer coating, a tie coating, an adhesion-promoting coating, or a combination thereof can be applied to the surface of the substrate before applying the curable composition.

The pressure-sensitive polyurethane or epoxy adhesive formulations can be disposed on a surface of the substrate(s) in an amount effective to effective to provide adhesion. For example, a thickness of the pressure-sensitive adhesive precursor compositions can be from 10 to 10,000 micrometers (μm).

The substrate to be adhered can be of any material, including, for example, a metal, an alloy, a thermoplastic, a thermoset resin, a natural material (e.g., wood, cellulose, sisal jute, cork, or the like), or a combination thereof. In other words, the substrate can be a marine structure, for example a metal, an alloy, a thermoplastic, a thermoset resin, a natural material such as wood, or a combination thereof that is used as a marine structure. Exemplary marine structures include, but are not limited to, a ship hull, a propeller, a rudder, a keel, a centerboard, a fin, a hydrofoil, a deck surface, a buoy, a pier, a wharf, a jetty, a fishing net, a cooling system surface, a cooling water intake or discharge pipe, a nautical beacon, a floating beacon, a floating breakwater, a dock, a pipeline, a tank, a bridge, a bell, a plumb, a dredge, a pump, a valve, a rope, a ladder, a pontoon, an antenna, a periscope, a snorkel, a gun mount, a gun barrel, a launch tube, a mine, a torpedo, or a depth charge. Other exemplary substrates include fish nets, fish cages, and fabrics.

This disclosure is further illustrated by the following examples, which are non-limiting.

EXAMPLES

The components listed in Table 1 were used in the examples.

TABLE 1

| Compound | Description | Source |
|---|---|---|
| Glycerol | 1,2,3-Propanetriol | Sigma |
| DABCO | 1,4-diazabicyclo[2.2.2]octane | Sigma |
| PEI | Polyethyleneimine solution (50% in water), branched, average Mn about 60 kDA by GPC, average Mw about 750,000 Da by LS | Sigma |
| Nanoclay | Surface modified nanoclay including 35-45 wt. % dimethyl dialkyl ($C_{14-18}$) amine | Sigma |
| Mineral oil | Heavy mineral oil | Sigma |
| TMXDI | 1,3-bis(2-isocyanatopropan-2-yl)benzene | TCI America |

Example 1. Synthesis of Microcapsules

To a 100 mL Erlenmeyer flask was added, in order, 18 g of glycerol, 18 g of DABCO, 8 g PEI solution and 1 g water. The mixture was stirred and heated at 60° C. for 1 hour until uniform. In a 500 mL flask, 2 g of hydrophobically modified nanoclay was added to 200 mL of heavy mineral oil and homogenized with a rotor-stator for 30 minutes (level 8) until solution was of low viscosity, semitransparent, and completely mixed. The still-warm DABCO solution prepared above is added to the 500 mL flask with rotor-stator mixing (level 8). Once addition is complete, mixing is continued with the rotor-stator for 5 minutes at level 5 to stabilize the suspension. In separate container, 15.4 g (63 mmols) of the isocyanate cross-linker (TMXDI) and 20 g of heavy mineral oil were mixed. Immediately after mixing the isocyanate cross-linker solution, it was added to the glycerol/DABCO/PEI/nanoclay solution over a period of 3 minutes. Once completely added, the combination was mixed (level 5) for an additional 30 minutes. This mixture was then transferred to a 500 mL Erlenmeyer flask and stir-mixed overnight on rotating shaker table at 160 rpm. The next morning, the stir-mixed solution was heated to 80° C. with stirring at 160 rpm for 8 hours on the rotating shaker table in an oven. After 8 hours, the solution was removed from the oven and allowed to cool.

Next, diethyl ether was added to the cooled solution and gently inverted several times, then the microcapsules were allowed to settle the supernatant decanted. This process was repeated 3-5 times, until the mineral oil was substantially or completely removed. The microcapsules suspended in diethyl ether were gently poured onto a glass dish and allow to dry in air to provide a powder.

Example 2. Pressure-Activated Polyurethane Adhesive and Adhesion Testing

The stabilized, dry microcapsules prepared as described in Example 1 above were tested for release of the polyol and tertiary base DABCO after mixing with an isocyanate resin mixture (commercially available as Gorilla Glue) and which was diluted with diethyl ether (5:2 v/v).

The dry microcapsules were mixed with the resin mixture (1:9 m/m or 1:4 m/m) to prepare a pressure-sensitive, i.e., pressure-activated adhesive. The mixture was applied to one side of an untreated steel coupon using a pipette or by pouring, and then a second untreated steel coupon was disposed on the adhesive layer and pressure was applied by binder clips until full cure was achieved.

Figure 1:
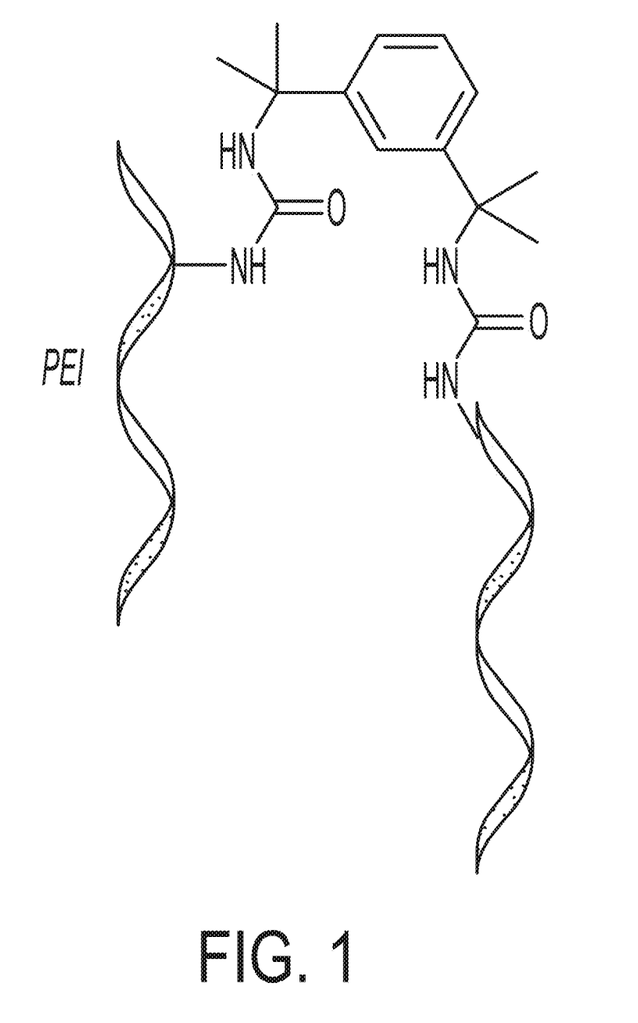
FIG. 1 is a schematic diagram of a tetramethylxylylene diisocyanate (TMXDI)-crosslinked polyurea of the shell of the microcapsules of Example 1.
Figure 2:
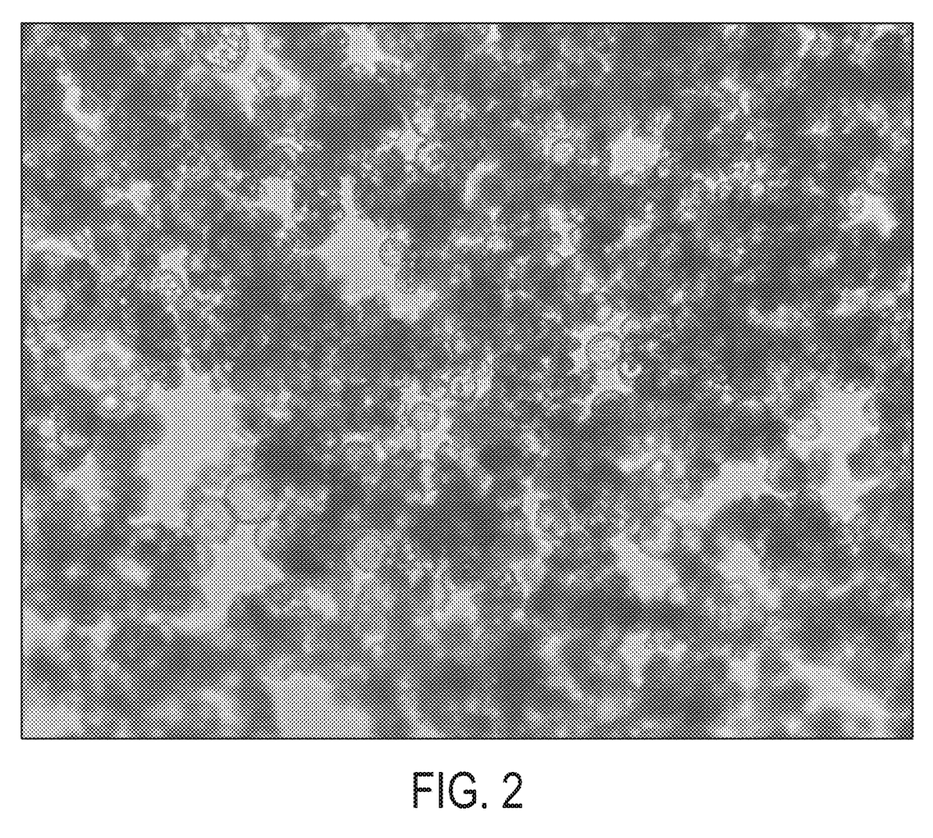
FIG. 2 is a 50× magnification image of the microcapsules of Example 1 in an oil dispersion.
Figure 3:
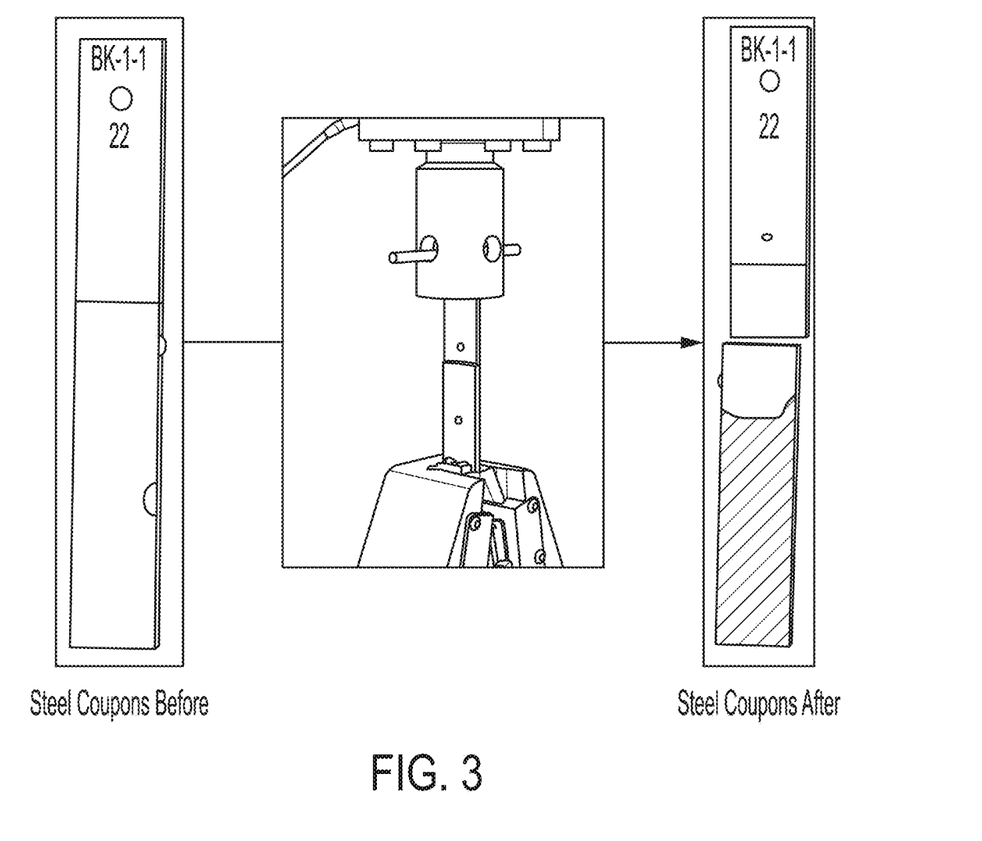
FIG. 3 illustrates an for lap shear testing.
Figure 4:
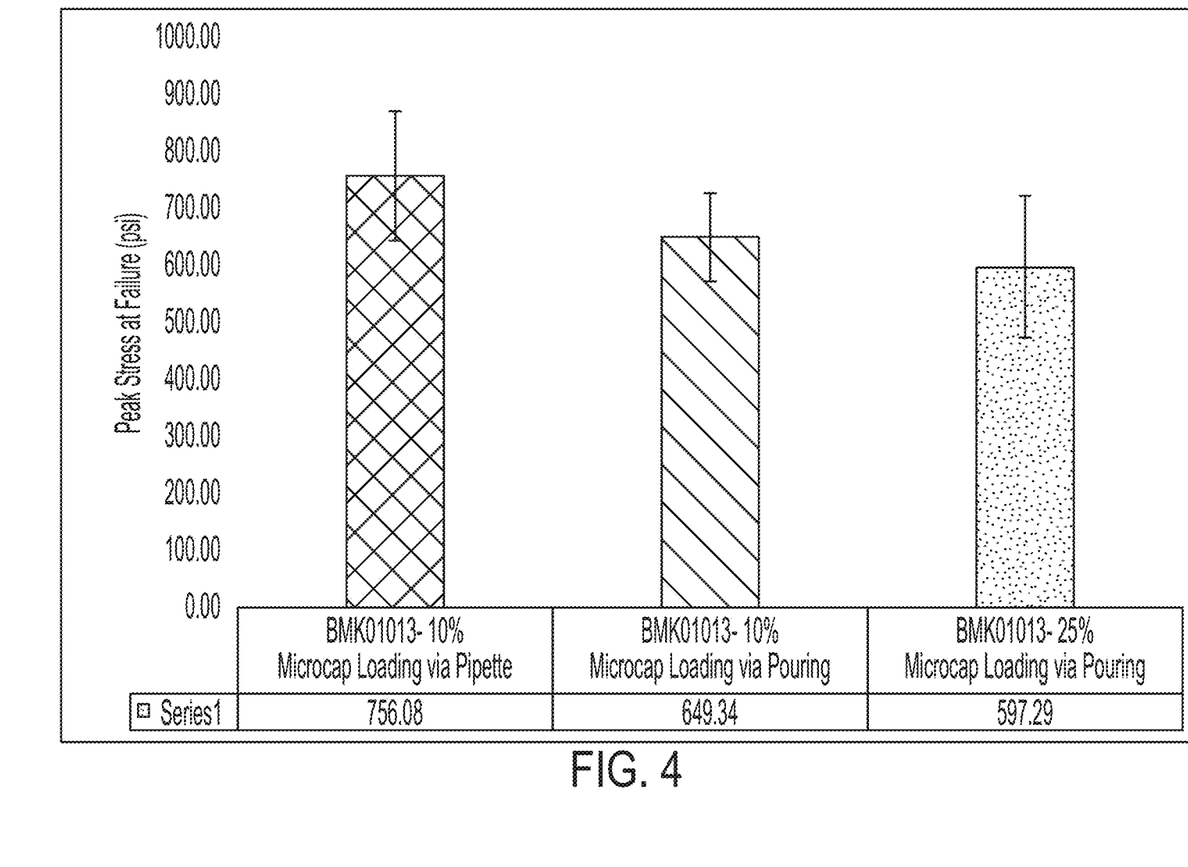
FIG. 4 is a bar graph showing the results of lap shear testing of the polyurethane adhesives of Example 2.

Lap shear testing was conducted using the apparatus shown in FIG. 3. The results are shown in FIG. 4. The pressure-activated adhesive mixture provided strong adhesion (about 600-750 psi) between the two steel coupons.

Example 2. Pressure-Activated Epoxy Adhesive

The stabilized, dry microcapsules prepared as described in Example 1 above can be added to a commercially-available epoxy formulation to prepare a pressure-sensitive, i.e., pressure-activated adhesive epoxy formulation. The formulation can be applied to one side of a substrate, e.g., an untreated steel coupon using a pipette or by pouring, and then a second substrate, i.e., a second untreated steel coupon can be disposed on the adhesive layer and pressure applied by hand or other means until full cure is achieved.

This disclosure further encompasses the following aspects.

Aspect 1. A microcapsule including: a shell including nanoclay platelets and a polyurea product of an interfacial polymerization of a polyamine and an aromatic polyisocyanate; and a core composition encapsulated by the shell, wherein the core composition includes a base catalyst for formation of a polyurethane adhesive or an epoxy adhesive, a polyol, and a hydrophilic solvent.

Aspect 2. The microcapsule of Aspect 1, wherein the polyamine compound is a polyethylene imine.

Aspect 3. The microcapsule of Aspect 1, wherein the aromatic polyisocyanate is of Formula II:

(II)

wherein in formula II, each R is independently hydrogen, halide, nitro, cyano, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, $C_{7-13}$ alkylaryloxy, —C(O)R$^4$, —OC(O)R$^5$, —C(O)OR$^6$, —C(O)N(R$^7$)(R$^8$), or —N(R$^9$)$_3$, wherein R$^4$ to R$^9$ are each independently $C_{1-12}$ alkyl, $C_{1-12}$ alkoxy, $C_{1-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{2-12}$ aryloxyalkyl, $C_{7-13}$ arylalkyl, $C_{7-13}$ arylalkoxy or $C_{7-13}$ alkylaryloxy; A is a $C_{6-36}$ aryl or $C_{2-17}$ heteroaryl group having at least one aromatic ring and a valence z; each L is independently a single bond, $C_{1-12}$ alkylene, $C_{2-12}$ alkenylene, $C_{2-12}$ alkynylene, $C_{6-12}$ arylene, —C(O)—, —N(R$^{11}$)—, —S—, —S(O)—, —S(O)$_2$—, or —Si(O)(R$^{12}$)(R$^{13}$)—, wherein R$^{11}$ to R$^{13}$ are each independently $C_{1-12}$ alkyl, $C_{1-12}$ alkoxy, $C_{1-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ alkoxyaryl, or $C_{7-13}$ alkylaryl; and x is 1-z and y is 1-6, provided that x or y is at least 2.

Aspect 4. The microcapsule of Aspect 3, wherein the aromatic polyisocyanate is of Formula IIa:

(IIa)

wherein in formula IIa, each R is independently hydrogen, halide, nitro, cyano, $C_{1-12}$ alkyl, $C_{1-12}$ alkoxy, $C_{2-12}$ alkoxyalkyl, $C_{2-12}$ alkenyl, $C_{1-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, $C_{7-13}$ alkylaryloxy, —C(O)R$^4$, —OC(O)R$^5$, —C(O)OR$^6$, —C(O)N(R$^7$)(R$^8$), or —N(R$^9$)$_3$, wherein R$^4$ to R$^9$ are each independently $C_{1-12}$ alkyl, $C_{1-12}$ alkoxy, $C_{1-12}$ alkoxyalkyl, $C_{1-12}$ alkenyl, $C_{1-12}$ alkenyloxy, $C_{3-8}$ cycloalkyl, $C_{3-8}$ cycloalkoxy, $C_{3-8}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy; A is an aryl or heteroaryl group having a valence z; each R$^1$ is independently hydrogen, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy; x is 1-z and y is 1, provided that x is at least 2.

Aspect 5. The microcapsule of Aspect 1, wherein the aromatic polyisocyanate is of Formula IIb:

(IIb)

wherein in formula IIb, each R is independently hydrogen, halide, nitro, cyano, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, $C_{7-13}$ alkylaryloxy, —C(O)R$^4$, —OC(O)R$^5$, —C(O)OR$^6$, —C(O)N(R$^7$)(R$^8$), or —N(R$^9$)$_3$, wherein R$^4$ to R$^9$ are each independently $C_{3-8}$ alkyl, $C_{3-8}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy; each L is independently a single bond, $C_{1-12}$ alkylene, $C_{2-12}$ alkenylene, $C_{6-12}$ arylene, —C(O)—, —O—, —N(R$^{11}$)—, —S—, —S(O)—, —S(O)$_2$; or —Si(O)(R$^{12}$)(R$^{13}$)—, wherein R$^{11}$ to R$^{13}$ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{1-12}$ cycloalkyl, $C_{3-8}$ cycloalkoxy, $C_{6-14}$ aryl, $C_{6-12}$ aryloxy, $C_{7-13}$ aryloxyalkyl, $C_{7-13}$ arylalkyl, $C_{7-13}$ alkoxyaryl, or $C_{7-13}$ alkylaryl; and x is 1-6 and y is 1-6, provided that x or y is at least 2.

Aspect 6. The microcapsule of Aspect 5, wherein the aromatic polyisocyanate is of Formula IIc:

(IId)

wherein in Formula IIc, each R is independently hydrogen, halide, nitro, cyano, $C_{1-12}$ alkyl, $C_{1-12}$ alkoxy, $C_{2-12}$ alkoxyalkyl, $C_{2-12}$ alkenyl, $C_{2-13}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, $C_{7-13}$ alkylaryloxy, —C(O)R$^4$, —OC(O)R$^5$, —C(O)OR$^6$, —C(O)N(R$^7$)(R$^8$), or —N(R$^9$)$_3$, wherein R$^4$ to R$^9$ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy; each R$^1$ is independently hydrogen, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy; and x is 2-6 and y is 1.

Aspect 7. The microcapsule of Aspect 6, wherein each R is H, each R$^1$ is methyl, y is 1, and x is 2.

Aspect 8. The microcapsule of Aspect 1, wherein the aromatic polyisocyanate is p-phenylene diisocyanate, m-phenylene diisocyanate, o-phenylene diisocyanate, 1,2,3-phenylene triisocyanate, 1,2,4-phenylene triisocyanate, 1,3,4-phenylene diisocyanate, 2,3-toluene diisocyanate, 2,4-toluene diisocyanate, 2,5-toluene diisocyanate, 3,4-toluene diisocyanate, 3,5-toluene diisocyanate, 1,4-bis(isocyanatomethyl)benzene, 1,3-bis(isocyanatomethyl)benzene, 1,3-is(isocyanatomethyl)benzene 1,3-bis(2-isocyanatopropan-2-yl)benzene, 2,2-bis(4-isocyanatophenyl)propane, triphenylmethane 4,4',4"-triisocyanate, meta-xylene diisocyanate, or a combination thereof.

Aspect 9. The microcapsule of Aspect 1, wherein the base catalyst is a tertiary amine.

Aspect 10. The microcapsule of Aspect 1, wherein the polyol is an aliphatic $C_{1-30}$ polyol.

Aspect 11. The microcapsule of Aspect 1, wherein the hydrophilic solvent includes water and the hydrophobic solvent includes a solvent for the polyisocyanate.

Aspect 12. The microcapsule of Aspect 1, wherein the microcapsule has an average diameter of 1 to 2,000 micrometers, or 5 to 1,000 micrometers, or 10 to 500 micrometers.

Aspect 13. A method of preparing a plurality of the microcapsules of Aspect 1, the method including: forming a biphasic polymerizable mixture including an aqueous solvent, an organic solvent immiscible with the aqueous solvent, the nanoclay platelets, the polyamine, the aromatic polyisocyanate, the base catalyst for formation of a polyurethane, and the polyol; providing multiple interfaces between the aqueous phase and the organic phase in the biphasic polymerizable mixture; and polymerizing the polyamine and the aromatic polyisocyanate at the multiple interfaces to provide the plurality of the microcapsules.

Aspect 14. A composition for the manufacture of the microcapsule of Aspect 1, the composition including: a biphasic polymerizable mixture including an aqueous solvent, an organic solvent immiscible with the aqueous solvent, the nanoclay, the polyamine, the aromatic polyisocyanate, the base catalyst for formation of a polyurethane, and the polyol.

Aspect 15. A pressure-sensitive polyurethane or epoxy adhesive formulation, including: a plurality of the microcapsules of Aspect 1; and polyurethane or epoxy adhesive formulation.

Aspect 16. The polyurethane or epoxy adhesive formed from the precursor composition of Aspect 15.

Aspect 17. A method of adhering a first and a second substrate, the method including: disposing the pressure-sensitive polyurethane or epoxy adhesive formulation of Aspect 16 between the first substrate and the second substrate; and applying pressure to the disposed pressure-sensitive polyurethane or epoxy adhesive formulation effective to rupture the plurality of microcapsules and form an adhesive layer between the first substrate and the second substrate.

Aspect 18. The method of Aspect 18, wherein the adhering is under water.

Aspect 19. The method of Aspect 18, wherein the first substrate, the second substrate, or both include a metal, an alloy, a thermoplastic, a thermoset, a natural material, or a combination thereof.

The compositions, methods, and articles can alternatively include, comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, more specifically, 5 to 20 wt %", is inclusive of the endpoints and all intermediate values of the ranges of "5 to 25 wt %," etc.). "Combinations" is inclusive of blends, mixtures, alloys, reaction products, and the like. The terms "first," "second," and the like, do not denote any order, quantity, or importance, but are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. The suffix "(s)" is intended to include both the singular and the plural of the term that it modifies, thereby including at least one of that term (e.g., the colorant(s) includes at least one colorant). A "combination thereof" is open and includes any combination including at least one of the listed components or properties optionally together with a like or equivalent component or property not listed. "Each independently" as used herein means that the named variables can independently be the same or different.

Reference to "some aspects," "an aspect," and so forth, means that a particular element described in connection with the aspect is included in at least one aspect described herein, and may or may not be present in other aspects. In addition, it is to be understood that the described elements can be combined in any suitable manner in the various aspects. "Optional" or "optionally" means that the subsequently described component, event, or circumstance may or not be present or occur, and that the description includes instances where the component, event, or circumstance is present or occurs and instances where it does not.

Unless defined otherwise, technical and scientific terms used herein have the same meaning as is understood by one of skill in the art to which this disclosure belongs. However, if a term in the present application contradicts or conflicts with a term in the incorporated reference, the term from the present application takes precedence over the conflicting term from the incorporated reference. All cited patents, patent applications, and other references are incorporated herein by reference in their entirety. Unless specified to the contrary herein, all test standards are the most recent standard in effect as of the filing date of this application, or, if priority is claimed, the filing date of the earliest priority application in which the test standard appears.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent including carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); "alkenyloxy" refers to an alkenyl group attached through an oxygen bridge; "arylalkoxy" refers to an alkoxy group that has been substituted with an aryl group; "aryloxy" refers to an aryl group as defined above with the indicated number of carbon atoms attached through an oxygen bridge (—O—); "aryloxyalkyl" refers to an alkyl group that has been substituted with an aryloxy group; "alkylaryloxy" refers to an aryloxy group that has been substituted with an alkyl group. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. The "(meth)acryl" prefix includes both methacryl and acryl, the "(meth)allyl" prefix includes both methallyl and allyl, and the "(meth)acrylamide" prefix includes both methacrylamide and acrylamide.

Unless substituents are otherwise indicated, each of the foregoing groups can be unsubstituted or substituted, provided that the substitution does not significantly adversely affect synthesis, stability, or use of the compound. The term "substituted" as means that at least one hydrogen on the designated atom or group is replaced with another group, provided that the designated atom's normal valence is not exceeded. When the substituent is oxo (i.e., =O), then two hydrogens on the atom are replaced. Combinations of substituents or variables are permissible. Exemplary groups that can be present on a "substituted" position include, but are not limited to, nitro (—NO$_2$), cyano (—CN), hydroxy (—OH), amino (—NH$_2$), mono- or di-(C$_{1-6}$)alkylamino, alkanoyl (such as a C$_{2-6}$alkanoyl group such as acyl), formyl (—C(=O)H), carboxylic acid or an alkali metal or ammonium salt thereof, C$_{2-6}$ alkyl ester (—C(=O)O-alkyl or —OC(=)-alkyl), C$_{7-13}$ aryl ester (—C(=O)O-aryl or —OC(=O)-aryl), amido (—C(=O)NR$_2$ wherein R is hydrogen or C$_{1-6}$alkyl), carboxamido (—CH$_2$C(=O)NR$_2$ wherein R is hydrogen or C$_{1-6}$ alkyl), halogen, thiol (—SH), C$_{1-6}$ alkylthio (—S-alkyl), thiocyano (—SCN), C$_{1-6}$ alkyl, C$_{1-6}$ alkenyl, C$_{2-6}$alkynyl, C$_{1-6}$ haloalkyl, C$_{1-9}$ alkoxy, C$_{1-6}$ haloalkoxy, C$_{3-12}$ cycloalkyl, C$_{5-18}$ cycloalkenyl, C$_{6-12}$ aryl having at least one aromatic ring (e.g., phenyl, biphenyl, naphthyl, or the like, each ring either substituted or unsubstituted aromatic), C$_{1-9}$ arylalkyl having 1 to 3 separate or fused rings and from 6 to 18 ring carbon atoms, arylalkoxy having 1 to 3 separate or fused rings and from 6 to 18 ring carbon atoms, C$_{7-12}$ alkylaryl, C$_{4-12}$ heterocycloalkyl, C$_{3-12}$ heteroaryl, C$_{1-6}$ alkyl sulfonyl (—S(=O)$_2$-alkyl), C$_{6-12}$ arylsulfonyl (—S(=O)$_2$-aryl), or tosyl (CH$_3$C$_6$H$_4$SO$_2$—), provided that the substituted atom's normal valence is not exceeded. When a compound is substituted, the indicated number of carbon atoms is the total number of carbon atoms in the compound or group, including those of any substituents.

While typical aspects have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A stabilized microcapsule comprising:
    a shell consisting essentially of:
        nanoclay platelets; and
        a polyurea product of an interfacial polymerization of a polyamine and an aromatic polyisocyanate; and
    a core composition encapsulated by the shell, wherein the core composition comprises a base catalyst of a polyurethane adhesive or an epoxy adhesive, a polyol, and a hydrophilic solvent.

2. The microcapsule of claim 1, wherein the polyamine compound is a polyethylene imine.

3. The microcapsule of claim 1, wherein the aromatic polyisocyanate is of Formula II:

(II)

wherein in formula II,
    each R is independently hydrogen, halide, nitro, cyano, C$_{1-12}$ alkyl, C$_{1-12}$ alkoxy, C$_{2-12}$ alkoxyalkyl, C$_{2-12}$ alkenyl, C$_{2-12}$ alkenyloxy, C$_{3-8}$ cycloalkyl, C$_{3-8}$ cycloalkoxy, C$_{6-14}$ aryl, C$_{6-10}$ aryloxy, C$_{7-13}$ aryloxyalkyl, C$_{7-13}$ arylalkyl, C$_{7-13}$ arylalkoxy, C$_{7-13}$ alkylaryl, C$_{7-13}$ alkylaryloxy, —C(O)R$^4$, —OC(O)R$^5$, —C(O)OR$^6$, —C(O)N(R$^7$)(R$^8$), or —N(R$^9$)$_3$, wherein R$^4$ to R$^9$ are each independently C$_{1-12}$ alkyl, C$_{1-12}$ alkoxy, C$_{2-12}$ alkoxyalkyl, C$_{2-12}$ alkenyl, C$_{2-12}$ alkenyloxy, C$_{3-8}$ cycloalkyl, C$_{3-8}$ cycloalkoxy, C$_{6-14}$ aryl, C$_{6-10}$ aryloxy, C$_{7-13}$ aryloxyalkyl, C$_{7-13}$ arylalkyl, C$_{7-13}$ arylalkoxy, C$_{7-13}$ alkylaryl, or C$_{7-13}$ alkylaryloxy;
    A is a C$_{6-36}$ aryl or C$_{2-17}$ heteroaryl group having at least one aromatic ring and a valence z;
    each L is independently a single bond, C$_{1-12}$ alkylene, C$_{2-12}$ alkenylene, C$_{2-12}$ alkynylene, C$_{6-12}$ arylene, —C(O)—, —N(R$^{11}$)—, —S—, —S(O)—, —S(O)$_2$—, or —Si(O)(R$^{12}$)(R$^{13}$)—, wherein R$^{11}$ to R$^{13}$ are each independently C$_{1-12}$ alkyl, C$_{1-12}$ alkoxy, C$_{2-12}$ alkoxyalkyl, C$_{2-12}$ alkenyl, C$_{2-12}$ alkenyloxy, C$_{3-8}$ cycloalkyl, C$_{3-8}$ cycloalkoxy, C$_{6-14}$ aryl, C$_{6-10}$ aryloxy, C$_{7-13}$ aryloxyalkyl, C$_{7-13}$ arylalkyl, C$_{7-13}$ alkoxyaryl, or C$_{7-13}$ alkylaryl; and
    x is 1-z and y is 1-6, provided that x or y is at least 2.

4. The microcapsule of claim 3, wherein the aromatic polyisocyanate is of Formula IIa:

(IIa)

wherein in formula IIa,
    each R is independently hydrogen, halide, nitro, cyano, C$_{1-12}$ alkyl, C$_{1-12}$ alkoxy, C$_{2-12}$ alkoxyalkyl, C$_{2-12}$ alkenyl, C$_{2-12}$ alkenyloxy, C$_{3-8}$ cycloalkyl, C$_{3-8}$ cycloalkoxy, C$_{6-14}$ aryl, C$_{6-10}$ aryloxy, C$_{7-13}$ aryloxyalkyl, C$_{7-13}$ arylalkyl, C$_{7-13}$ arylalkoxy, C$_{7-13}$ alkylaryl, C$_{7-13}$ alkylaryloxy, —C(O)R$^4$, —OC(O)R$^5$,

—C(O)OR⁶, —C(O)N(R⁷)(R⁸), or —N(R⁹)₃,
wherein R⁴ to R⁹ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C^{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy;

A is an aryl or heteroaryl group having a valence z;

each $R^1$ is independently hydrogen, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy;

x is 1-z and y is 1, provided that x is at least 2.

5. The microcapsule of claim 1, wherein the aromatic polyisocyanate is of Formula IIb:

(IIb)

wherein in formula IIb, each R is independently hydrogen, halide, nitro, cyano, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, $C_{7-13}$ alkylaryloxy, —C(O)R⁴, —OC(O)R⁵, —C(O)OR⁶, —C(O)N(R⁷)(R⁸), or —N(R⁹)₃, wherein R⁴ to R⁹ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy;

each L is independently a single bond, $C_{1-12}$ alkylene, $C_{2-12}$ alkenylene, $C_{6-12}$ arylene, —C(O)—, —O—, —N(R¹¹)—, —S—, —S(O)—, —S(O)₂—, or —Si(O)(R¹²)(R¹³)—, wherein R¹¹ to R¹³ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ alkoxyaryl, or $C_{7-13}$ alkylaryl; and x is 1 to 6 and y is 1 to 6, provided that x or y is at least 2.

6. The microcapsule of claim 5, wherein the aromatic polyisocyanate is of Formula IIc:

(IIc)

wherein in Formula IIc, each R is independently hydrogen, halide, nitro, cyano, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, $C_{7-13}$ alkylaryloxy, —C(O)R⁴, —OC(O)R⁵, —C(O)OR⁶, —C(O)N(R⁷)(R⁸), or —N(R⁹)₃, wherein R⁴ to R⁹ are each independently $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy;

each $R^1$ is independently hydrogen, $C_{1-12}$ alkyl, $C_{1-12}$ alkoxy, $C_{2-12}$ alkoxyalkyl, $C_{2-12}$ alkenyl, $C_{2-12}$ alkenyloxy, $C_{3-8}$ cycloalkyl, $C_{3-8}$ cycloalkoxy, $C_{6-14}$ aryl, $C_{6-10}$ aryloxy, $C_{7-13}$ aryloxyalkyl, $C_{7-13}$ arylalkyl, $C_{7-13}$ arylalkoxy, $C_{7-13}$ alkylaryl, or $C_{7-13}$ alkylaryloxy; and x is 2 to 6 and y is 1.

7. The microcapsule of claim 6, wherein each R is H, each R1 is methyl, y is 1, and x is 2.

8. The microcapsule of claim 1, wherein the aromatic polyisocyanate is p-phenylene diisocyanate, m-phenylene diisocyanate, o-phenylene diisocyanate, 1,2,3-phenylene triisocyanate, 1,2,4-phenylene triisocyanate, 1,3,4-phenylene diisocyanate, 2,3-toluene diisocyanate, 2,4-toluene diisocyanate, 2,5-toluene diisocyanate, 3,4-toluene diisocyanate, 3,5-toluene diisocyanate, 1,4-bis(isocyanatomethyl) benzene, 1,3-bis(isocyanatomethyl) benzene, 1,3-is(isocyanatomethyl) benzene 1,3-bis(2-isocyanatopropan-2-yl) benzene, 2,2-bis(4-isocyanatophenyl) propane, triphenylmethane 4,4',4''-triisocyanate, meta-xylene diisocyanate, or a combination thereof.

9. The microcapsule of claim 1, wherein the base catalyst is a tertiary amine.

10. The microcapsule of claim 1, wherein the polyol is an aliphatic C1-30 polyol.

11. The microcapsule of claim 1, wherein the hydrophilic solvent comprises water and the hydrophobic solvent comprises a solvent for the polyisocyanate.

12. The microcapsule of claim 1, wherein the microcapsule has an average diameter of 1 to 2,000 micrometers, or 5 to 1,000 micrometers, or 10 to 500 micrometers.

* * * * *